3,069,312
N-SUBSTITUTED DIMETHYL 1-CARBAMOYLOXY-2,2,2-TRICHLOROETHYL PHOSPHONATES AS INSECTICIDAL COMPOSITIONS

Gustave K. Kohn, Berkeley, Calif., assignor to California Research Corporation, San Francisco, Calif., a corporation of Delaware
No Drawing. Filed Sept. 28, 1960, Ser. No. 58,897
7 Claims. (Cl. 167—22)

This invention relates to a novel class of phosphonates and a method of their preparation. In particular, the invention relates to the production of a new class of N-substituted dimethyl 1-carbamoyloxy-2,2,2-trichloroethyl phosphonates which are of particular value as toxicants and useful in the formulation of insecticidal compositions.

It has now been found that a new class of phosphonates, namely the N-substituted dimethyl 1-carbamoyloxy-2,2,2-trichloroethyl phosphonates, show excellent insecticidal characteristics. These new compounds are represented as follows:

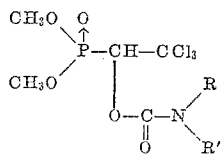

wherein R and R' represent the same or different members selected from the group consisting of hydrogen, alkyl and substituted and unsubstituted phenyl. Unusually good insecticidal compositions are those wherein either R or R' is a member of the class consisting of lower alkyl or substituted and unsubstituted phenyl, the preferred phenyl substituent groups being selected from the class consisting of lower alkyl and halogen.

The N-substituted carbamoyloxy phosphonates of the invention are the carbamate derivatives of dimethyl 1-hydroxy-2,2,2-trichloroethyl phosphonate, known as dipterex, but the carbamate derivatives of the invention have been found in many instances to possess superior insecticidal activity against a greater variety of insects than does dipterex, which itself is used as an insecticide. Accordingly, the novel compounds of the invention are not only effective as muscicides, but also show a high degree of toxicity in relatively low concentrations against other insects such as mites and aphids.

The dimethyl 1-carbamoyloxy-2,2,2-trichloroethyl phosphonates can be prepared by one of two methods of preparation. The choice between the two methods of preparation will depend on the particular compound to be prepared and the reactants available.

Fundamentally, the first method of preparation of N-monosubstituted carbamoyloxy phosphonates of the invention involves the reaction between dimethyl 1-hydroxy-2,2,2-trichloroethyl phosphonate and an isocyanate. The particular isocyanate used is selected to obtain the desired N-mono-substituted carbamoyloxy phosphonate.

The preparation consists in reacting approximately equimolar quantities of dimethyl 1-hydroxy-2,2,2-trichloroethyl phosphonate with the selected isocyanate at temperatures in the range from about 0° C. to about 150° C., the temperature of reaction depending on the particular reactants and products involved. The temperature of reaction is not critical and should be selected to be sufficiently high to cause the reaction to take place at a reasonable rate, yet below the temperature at which either products or reactants tend to decompose. A catalyst is desirable, although not necessary in this reaction. A few drops of a catalyst such as dibutyl tin dilaurate such as may be obtained from the Metal and Thermit Corporation, New York City, New York, under the trade name Thermolite-12, promotes the reaction, thereby requiring a lower temperature and shorter time than would otherwise be required. The reaction may be conducted in the presence of an inert solvent such as dried benzene, toluene, xylene, ethylene glycol dimethyl ether, diethylene glycol dimethyl ether, methylcyclohexane, cyclohexane, or other similar inert materials, if desired. However, where both the reactants are liquids, a solvent may be unnecessary. Where a solvent is used, however, the mixture is heated to the reflux temperature of the solvent for a sufficient period of time to allow the reaction to go essentially to completion. The course of the reaction may be followed either by change in refractive index or by alteration in infrared absorption or by a combination of these methods well known in the art.

The alternate method of preparation involves the reaction of dimethyl 1-hydroxy-2,2,2-trichloroethyl phosphonate with an N-substituted or an N,N-disubstituted carbamoyl chloride to obtain the corresponding carbamoyloxy phosphonate. N,N-disubstituted carbamoyloxy phosphonates are prepared by this alternate method of preparation. The N-substituent groups are selected to obtain the desired product.

The preparation begins by reacting approximately equimolar quantities of the dimethyl 1-hydroxy-2,2,2-trichloroethyl phosphonate and the desired carbamoyl chloride at temperatures in the range from about 50° to about 150° C., the temperature of reaction depending on the particular reactants and products involved. Again the temperature should be selected sufficiently high to obtain a reasonable reaction rate, but not above the temperature at which the products or reactants tend to decompose. The reaction is usually conducted in the presence of one of the aforementioned inert solvents in order to enable the reaction to proceed in a liquid medium. Where a solvent is employed, the mixture is heated at the reflux point of the solvent for a sufficient period of time to cause essentially quantitative conversion of the reactants. At the end of this time, the solvent is removed by distillation and the desired product is isolated by crystallization or distillation. The course of the reaction may be followed in the same manner as above described for the first method.

As an illustration of the variation in specific compositions of the class of compounds of the invention, and the adaptability of the aforementioned methods of preparation, the following examples are presented. It is to be understood that the compounds prepared in these examples are merely representative of the various compounds falling within the scope of the N-substituted carbamoyloxy phosphonates and are not to be construed as limitations on the scope of the invention.

Example 1

A mixture of 51 g. dimethyl 1-hydroxy-2,2,2,-trichloroethyl phosphonate (dipterex), 23.8 g. distilled phenyl isocyanate, 150 g. dried toluene, and 2 drops dibutyl tin dilaurate was heated to reflux (115° C.) with suitable precautions to exclude moisture for 20 hours. On standing at room temperature, a white solid crystallized from the reaction mixture. This solid was removed by filtration and recrystallized twice from a mixture of acetone and toluene to obtain 19 g. of a white solid melting at 157°–159° C. and analyzed to be dimethyl 1-(N-phenylcarbamoyloxy)-2,2,2-trichloroethyl phosphonate.

| Percent of— | Found | Theory |
| --- | --- | --- |
| Cl | 28.2 | 28.25 |
| N | 3.7 | 3.72 |
| P | 8.2 | 8.23 |

Example 2

A mixture of 77 g. dimethyl 1-hydroxy-2,2,2-trichloroethyl phosphonate (dipterex) and 19 g. methyl isocyanate was sealed in a glass tube and heated in an oven at about 110° C. for 18 hours. The tube was cooled to room temperature, opened, and the liquid stirred to obtain crystalline material which was recrystallized three times from methanol to obtain a product consisting of 42 g. of a white solid melting at 112–114° C. and analyzed to be dimethyl 1-(N-methylcarbamoyloxy)-2,2,2-trichloroethyl phosphonate.

| Percent of— | Found | Theory |
| --- | --- | --- |
| Cl | 33.2 | 33.82 |
| N | 4.4 | 4.45 |
| P | 10.0 | 9.85 |

Example 3

A mixture of 51.5 g. dimethyl 1-hydroxy-2,2,2-trichloroethyl phosphonate (dipterex), 14.2 g. ethyl isocyanate, and 100 ml. of anhydrous benzene was prepared and heated to reflux for 20 hours. The reaction mixture was cooled to 15° C. and was then filtered and the filtrate distilled under reduced pressure to remove volatile substances. A residue remained which was recrystallized twice from ethanol to give the desired product, melting at 97–98° C., which was analyzed to be dimethyl 1-(N-ethylcarbamoyloxy)-2,2,2-trichloroethyl phosphonate.

| Percent of— | Found | Theory |
| --- | --- | --- |
| Cl | 32.4 | 32.4 |
| N | 4.22 | 4.26 |

The wide range of insecticidal applications of the compounds of the invention as well as their superiority over their prior art analogue, dipterex, can be seen by the following tests.

Dipterex was compared with a representative N-alkyl-substituted compound and N-phenyl-substituted compound of the invention, i.e., dimethyl 1-(N-ethylcarbamoyloxy)-2,2,2-trichloroethyl phosphonate and dimethyl 1-(N-phenyl-carbamoyloxy)-2,2,2-trichloroethyl phosphonate, respectively, on flies, mites, and aphids to ascertain their $LD_{85}$ values. These values are in terms of p.p.m. and show the concentration required to obtain an 85 percent kill. A lower concentration indicates a more highly effective toxicant.

The procedure by which the $LD_{85}$ values for flies are determined may be summarized as follows.

Female houseflies (*Musca domestica*) are anesthetized with $CO_2$ and triplicate series of 20 flies each are treated with $10^{-6}$ milliliters of acetone-toxicant solutions diluted to provide a range of 1000, 300, 100, 30 and 10 p.p.m. of toxicant. The flies are then placed in recovery cages for 24 hours at 80° F. The $LD_{85}$ is obtained by plotting the percent mortality for each replicated concentration on three-cycle logarithm probit paper.

In determining the $LD_{85}$ of mites and aphids, triplicate 0.5 millimeter discs of lima bean (V. Henderson) leaves are infested each with 20 two-spotted mites (*Tetranychus bimaculatus*) or 20 cowpea aphids (*Aphis medicaginis*), respectively, and dipped in acetone-toxicant solution diluted to provide a range of 100, 30, 10, 3 and 1 p.p.m. of toxicant. The excess liquid is shaken off, and the leaves are placed on filter paper in standard Petri plates wherein they are dried with a mild stream of warm air and then covered for 24 hours at room temperature. The $LD_{85}$ is obtained by plotting the percent mortality for each replicated concentration on two-cycle logarithm probit paper.

The results of these tests are shown in the following table:

| Compound | $LD_{85}$ in p.p.m. | | |
| --- | --- | --- | --- |
| | Flies | Mites | Aphids |
| Dipterex | 700 | 26 | 80 |
| Dimethyl 1-(N-ethylcarbamoyloxy)-2,2,2-trichloroethyl phosphonate | 400 | 30 | 35 |
| Dimethyl 1-(N-phenylcarbamoyloxy)-2,2,2-trichloroethyl phosphonate | 40 | 19 | <100 |

These results show that as an over-all insecticide these representative compounds of the invention are greatly superior to dipterex. Although comparable to dipterex against mites, dimethyl 1-(N-ethylcarbamoyloxy)-2,2,2-trichloroethyl phosphonate is shown to be about twice as effective as dipterex against flies and aphids. The phenyl analogue was vastly superior to dipterex against flies and also superior against mites. Accordingly, it is possible, by use of compounds of the invention, to tailor-make an insecticide which is extremely effective against certain insects, e.g., those indigenous to a particular area, if desired.

Aside from the specific formulation and application of the class of compounds of the invention as represented by the foregoing tests, these compounds may be dispersed in or upon other inert liquid and solid carriers and formulated with other dispersing or emulsifying agents. In addition, these compounds may be employed either per se or in combination with other active toxicants in the formulation of insecticidal compositions. In the preparation of dust formulations, various combinations of solid inert carrier materials such as talc, limestone, gypsum, bentonite, and other inert diluents, may be employed.

Obviously, many modifications and variations of the invention, as hereinbefore set forth, may be made without departing from the spirit and scope thereof, and therefore only such limitations should be imposed as are indicated in the appended claims.

I claim:

1. Dimethyl 1 - carbamoyloxy - 2,2,2 - trichloroethyl phosphonate having as a mono-N-substituent a member of the group consisting of lower alkyl, phenyl and lower alkyl phenyl.

2. An insecticidal composition comprising a biologically inert carrier and an insecticidal amount of dimethyl 1-carbamoyloxy-2,2,2-trichloroethyl phosphonate having as a mono-N-substituent a member of the group consisting of lower alkyl, phenyl and lower alkyl phenyl.

3. A method of controlling insects on plants subject to attack by said insects, which comprises contacting said plants with an insecticidal amount of dimethyl 1-carbamoyloxy-2,2,2-trichloroethyl phosphonate having as a mono-N-substituent a member of the group consisting of lower alkyl, phenyl and lower alkyl phenyl.

4. A method of killing insects, which comprises placing in contact with said insects an insecticidal amount of dimethyl 1-carbamoyloxy-2,2,2-trichloroethyl phosphonate having as a mono-N-substituent a member of the group consisting of lower alkyl, phenyl and lower alkyl phenyl.

5. N-lower alkyl dimethyl 1-carbamoyloxy-2,2,2-trichloroethyl phosphonate.

6. N-phenyl dimethyl 1-carbamoyloxy-2,2,2-trichloroethyl phosphonate.

7. N-lower alkylphenyl dimethyl 1-carbamoyloxy-2,2,2-trichloroethyl phosphonate.

References Cited in the file of this patent

UNITED STATES PATENTS

| | | |
|---|---|---|
| 2,668,839 | Tolkmith | Feb. 9, 1954 |
| 2,802,823 | Tolkmith | Aug. 13, 1957 |
| 2,848,492 | Saul | Aug. 19, 1958 |
| 2,955,069 | Jones | Oct. 4, 1960 |
| 2,955,070 | Jones | Oct. 4, 1960 |